June 9, 1942.  B. W. DAVID  2,285,498
OPTICAL MEASURING DEVICE
Filed May 27, 1940  2 Sheets-Sheet 1

INVENTOR.
Bruce W. David
BY Milburn & Milburn
ATTORNEYS.

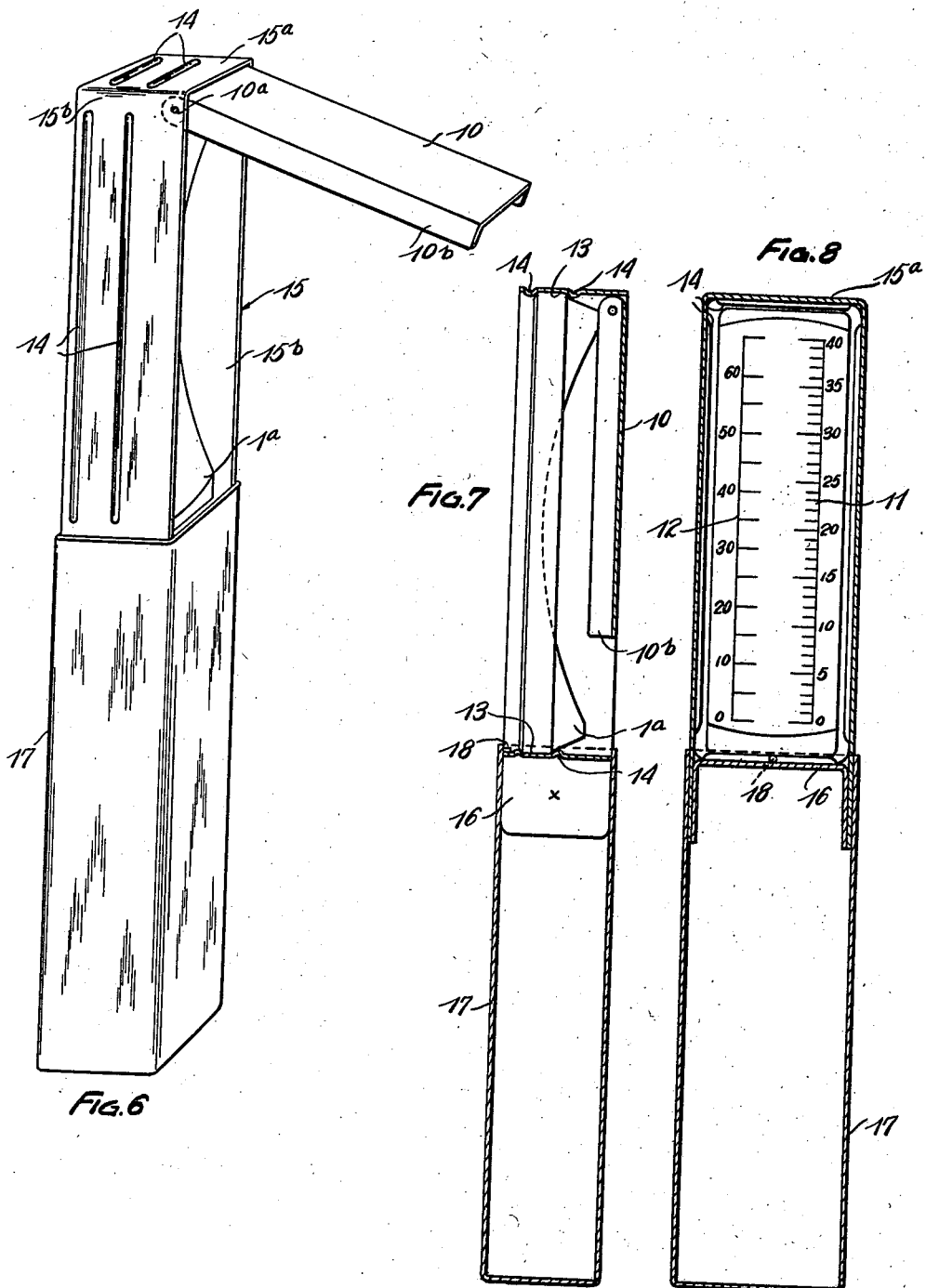

Patented June 9, 1942

2,285,498

UNITED STATES PATENT OFFICE 2,285,498

OPTICAL MEASURING DEVICE

Bruce W. David, Cleveland Heights, Ohio

Application May 27, 1940, Serial No. 337,446

4 Claims. (Cl. 88—2.2)

This invention relates to the art of optical viewing devices for measuring dimensions.

For instance, it is frequently desired to ascertain the height of a telephone or electric light pole, a tree or other structure by observation from the ground without resorting to climbing or direct measurement with a tape line or the like. Most if not all such prior devices designed for this purpose have involved triangulation with various features which render such method very inconvenient. For example, triangulation requires the ascertainment of the base distance from the observer to the pole or other object being measured, the angle which the line of sight makes with the base line to the pole or other object, the elevation of the eyes of the observer above the ground, the employment of a table for computation, and several other features which render this method rather complicated and inconvenient.

Therefore, the object of this invention is to provide an optical measuring device which is so constructed and arranged that the actual dimension of an object may be read directly from a calibrated scale associated therewith.

A further object is to provide such a device that can be readily employed for measuring various dimensions in different directions, as for instance height, length or breadth, so long as the dimension extends approximately in a plane at right angle to the line of sight of the observer.

Another object is to provide a measuring device so calibrated that when positioned at a predetermined distance from an object, the total and also partial measurements thereof may be read directly and at once without involving any calculation or reference to a table or the like.

Another object is to provide a measuring device of the type described which has a convenient optical means of positioning the device at the required observing distance without the necessity of direct measurement of that distance.

Another object is to provide a device that is so calibrated that it can be positioned with respect to a known partial measurement existing upon or purposely placed upon an object to be measured whereby the entire actual measurement thereof can be read directly and at once without involving any calculation or reference to a table or the like.

Another object is to provide such a device by which measurements of various parts of the entire dimension can be read at one and the same time without requiring individual computation or any change in the position or adjustment of the device during such multiple readings.

Another object is to provide such an optical measuring device with two or more scales so calibrated with reference to each other that they may be used individually for measurement or conjointly for calibration.

Another object is to provide such a device with a convenient, effective and compact form of holder or case for carrying and at the same time permitting ready and convenient use for the purpose intended.

Another object is to provide such a device with a sun-shade that can be raised to operative position for preventing lens reflection from interfering with the reading of the measurement and can be lowered to idle position for enclosure within the case.

Other objects will appear from the following description and claims when considered together with the accompanying drawings.

Referring to the accompanying drawings,

Fig. 6 is a perspective view of a modified form of device;

Fig. 7 is a vertical sectional view of this modified form of device with the sun-shade in lowered position; and Fig. 8 is a longitudinal sectional view of the same modified form of device, taken at ninety degrees to the view in Fig. 7.

Figure 1:
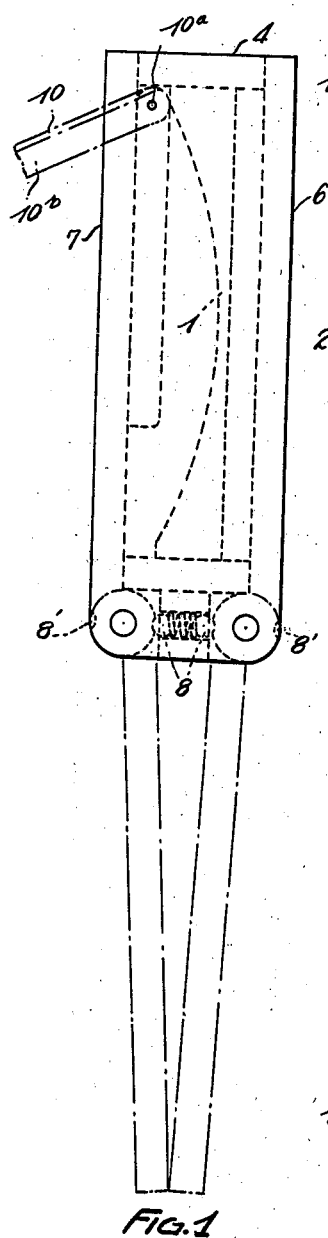
Fig. 1 is a side elevation of one form of my improved device and shows how the closure members may be turned into position to serve as a handle and the sun-shade may be raised to operative position.
Figure 2:
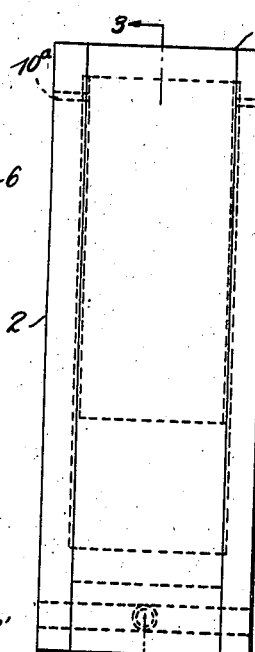
Fig. 2 is a rear elevation of the device in closed condition.
Figure 3:
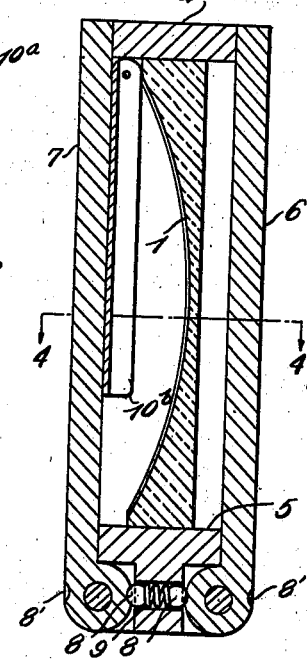
Fig. 3 is a view taken on line 3—3 of Fig. 2.
Figure 4:
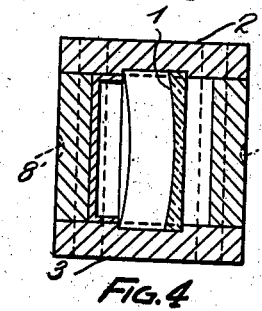
Fig. 4 is a view taken on line 4—4 of Fig. 3.
Figure 5:
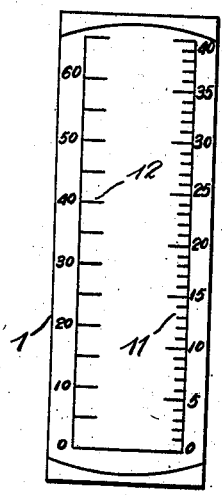
Fig. 5 illustrates the scales as viewed by the observer.

It is to be understood that the present form of disclosure is merely for the purpose of illustration and that there may be devised various modifications thereof without departing from the spirit of the present invention as herein set forth and claimed.

Referring now in detail to the form of device disclosed in Figs. 1 to 5 of the drawings, it comprises primarily a negative or reducing lens which is mounted in any suitable manner within a case. The case here disclosed comprises the walls 2 and 3 at the sides thereof, the top wall 4, the bottom wall 5, the front closure member 6 and the rear closure member 7. The lens 1 is mounted between the side walls 2 and 3 and the top wall is cut back so as not to obstruct the view through the top part of the lens and also for the purpose of accommodating the closure members 6 and 7. That is, when the members 6 and 7 are in closed position, they are flush with the side walls 2 and 3. The bottom wall 5 is likewise cut back so as to accommodate the front and rear walls.

The lens 1 is mounted with its flat face forward or towards the object being viewed, and the lens is exposed for an observation therethrough when the front and rear closure members are lowered into open position, as indicated in dotted lines in Fig. 1. The front and rear closure members are hingedly mounted at the bottom of the case so as to permit turning the same about opposite parallel axes slightly more than one hundred and eighty degrees, as indicated in Fig. 1. The closure members 6 and 7, when occupying such open position, serve as a handle by which the user can hold the device for viewing in the manner herein explained.

As a means of holding the closure members 6 and 7 in closed position, I have provided the balls 8 in the bottom wall 5 with a coil spring 9 therebetween so as to force the balls outwardly for engagement in corresponding recesses or depressions 8' in the bottom rounded portions of the closure members 6 and 7 at points corresponding to their closed position. Thus the closure members 6 and 7 are held positively and securely in closed position under spring pressure. Likewise, similar depressions may be provided in the opposite sides of the closure members so as to receive the balls and hold these members in open position.

The sky-shade or sun-shade 10 is a thin flap of metal or composition material which is pivoted within the side walls 2 and 3 at the points 10a and which may be swung upward to a convenient angle for the purpose of preventing reflections of the sun or sky on the concave surface of the lens from interfering with the reading of the scales. This sun-shade or sky-shade is adapted to be folded into the housing in a compact manner, permitting the closure member 7 to be closed over it, as indicated in the drawings. The frictional engagement of the side flanges 10b with the side walls 2 and 3 will serve to maintain the sky-shade in raised position.

Upon the flat surface of the lens itself or upon a transparent material associated therewith I have provided a plurality of graduations for ascertaining the measurement or measurements desired. The primary scale 11 at the right has graduations for every one-foot interval from zero (0) up to forty (40) feet, each multiple of five (5) being numbered as 5, 10, 15, etc. for convenience in reading.

As will be seen, the scale 11 as here shown provides for the measurement of a pole or other object not more than forty (40) feet high, the graduations being so spaced that when an observer stands at a distance of fifty (50) feet from the object and holds the device at a convenient reading distance before the eye, (about sixteen inches), the desired dimension of the object, or portions of the object, may be determined by noting the coincidence of the graduations on scale 11 with the image of the object as it appears in the lens. The device is so held that the zero mark (0) of the scale coincides with the foot of the object.

At the same time that an observer is ascertaining the total height of a pole, for instance, he may observe also the elevation of attached wires, cross arm lamp bracket, or telephone cable, etc. by direct and immediate observation of their corresponding coincidence with the graduated scale of feet, the zero mark (0) being held to correspond with the foot of the pole.

A convenient means of ascertaining the correct viewing position for the observer in the first use of any given scale, is to mark off on the observed pole a measured vertical distance, perhaps five (5) feet, whereupon the observer moves away from or towards the object until the graduations of the scale indicating the same marked-off distance correspond with the image thereof as seen through the lens. The total height of the pole and other desired shorter measurements may then be read off the scale. After the proper viewing distance has thus once been determined for any given scale, it is thereafter simply necessary for the observer to take his viewing position at such distance from the object.

When the device is used to measure the height of a pole, not more than forty (40) feet high, provided with steps spaced apart the standard distance of three (3) feet, advantage may be taken of the companion scale 12 appearing at the left of scale 11. Scale 12 has graduations corresponding to every three-foot interval on scale 11 but they need not be so numbered so far as this purpose is concerned. When the scale 12 is used in conjunction with scale 11, the observer moves away from or towards the pole until the graduations of scale 12 correspond with the spacing of the steps as they appear upon the observed image of the pole, at which position scale 11 is in calibration and is brought into use for the purpose of reading the desired measurements directly, as before.

In order that poles and other objects of greater height than forty (40) feet may be measured with this same device, advantage is taken of the graduations of scale 12, and the numbers 0, 5, 10, 15, etc. up to 65 have been provided thereon to indicate feet. Scale 12, as so numbered, may be used alone for obtaining measurements in the same manner as described for scale 11 but it will be understood that the observer must take up a station at a greater distance from the object, approximately eighty-four (84) feet, in the use of the present illustrated form of scale 12. Scale 12 may be brought into calibration by measuring this distance from the observer to the object, or by marking off a measured distance upon the object as before explained in connection with scale 11. A partial height or the height of a certain-easily observed feature on the pole or other object may be measured, using scale 11 as above explained, after which the observer moves back until the same measurement on scale 12 corresponds with the observed image of the same partial height or height of the given device. The total height and other desired intermediate heights may then be read directly from scale 12.

The two scales 11 and 12 could, of course, be combined into a single compound scale but the danger of confusion incident to such an arrangement makes it much more desirable to have separate scales as herein shown.

In Figs. 6, 7 and 8 I have illustrated a modified form of case, the parts of which are adapted for slidable adjustment and in which a part thereof serves as a means for holding the device in viewing position when the case is in extended position.

In this modification the lens 1a is substantially the same as in the first form of device except that it is provided with a marginal flange 13 on the sides thereof for engagement between the pairs of inwardly extending integrally formed ribs 14 on each wall of the case member 15. This constitutes a means for holding the lens in assembly, supplemented by the corresponding ribs on the bottom part of the case member 15, to be referred to hereafter.

The top wall 15a and the two side walls 15b of the case member 15 may, for instance, be made of sheet metal and bent into the form herein indicated, with the ribs 14 formed therein. The lens may then be inserted into position with its flange 13 between the ribs 14; whereupon the bottom end of the case member is closed by means of the inverted U-shaped one-piece member 16 which is inserted within the lower end portions of the side walls 15b by spot welding or in any other suitable manner. This bottom member 16 is also provided with the integral ribs 14 for co-operation with the ribs 14, above described, in engaging the ribs on the lens.

The sun-shade 10 in this modified form of device is the same as in the preceding form and is pivotally mounted in the same manner or in any other suitable manner between the walls 15b near the top thereof so as to function in the same manner as above explained.

The other companion member 17 of the modified form of case has four side walls and a bottom wall to receive the lens-holding member 15 which has slidable fit therewithin so as to either house the lens therewithin or expose the same for use in the manner explained. When the case is in extended condition, the lower part 17 thereof may be used as a means for holding the device in viewing position. When in collapsed position, the device including the sunshade will be housed within the case. The frictional engagement between the casing members 15 and 17 will hold them in either closed or extended position.

As a means for preventing the two parts of the case in Figs. 6, 7 and 8 from becoming separated when slid to extended or open position, I have provided pin 18 which extends inwardly from the top part of the rear wall of the bottom member of the case so as to engage the bottom of the upper casing member, as indicated in Figs. 7 and 8.

It is to be understood, of course, that the casing members 15 and 17 may be made of any suitable material.

Thus I have devised an instrument which makes possible the ready and accurate determination of measurements without error incident to estimating such dimensions and without the necessity of calculations involved in triangulation. With my device, it is possible to obtain a plurality of dimensions at a single observation with dependable accuracy and with comparative ease. This device can be conveniently carried in the pocket from one point of use to another and can be conveniently and effectively held in the hand of the user. These and other advantages are present in both of the forms of device herein illustrated and the same invention herein disclosed may be embodied in various other forms as well.

What I claim is:

1. An optical measuring device comprising a negative lens through which an object may be viewed and having a plurality of graduations associated therewith, said graduations being arranged to intercept the image of the object through said lens and being in the form of companion scales arranged side by side, one of said scales being calibrated and divided to indicate standard linear units and conventional multiples thereof, and the other scale being calibrated and divided to indicate arbitrary multiples of the same standard linear units to correspond with known observable intervals associated with the object being viewed, and the graduations of each scale being continuously progressive throughout and being spaced in a substantially uniform manner.

2. In combination, an optical viewing device and a case therefor having front and rear openings to provide the necessary clear line of sight therethrough, and front and rear closure members hinged upon front and rear parallel axes at the bottom of said case and adapted in their extreme open position to be brought together to serve as a handle for the viewing device.

3. An optical measuring device comprising a negative lens of substantially oblong form through which an object may be viewed and having associated therewith and arranged lengthwise thereof a scale of graduations that are continuously progressive in value and are spaced in a substantially uniform manner from one end of the scale to the other end thereof, said graduations being adapted to intercept the image of the object through the lens, in a manner corresponding directly with the progression of said graduations, and constituting a directly calibrated means when the lens is located at a prescribed distance from the object, whereby there can be obtained simultaneously a reading of the measurement of the entire object and measurements of parts thereof, and closure means of substantially the same length and width as said lens and adjustably mounted thereupon for movement to one position covering the same and to another position extending directly therefrom to serve as a handle therefor.

4. An optical measuring device comprising a negative lens through which an object may be viewed and having associated therewith a plurality of companion scales adapted to intercept the image of the object being viewed, said scales being arranged side by side and being calibrated in preferred linear units, one of said scales representing a certain total number of linear units and the other of said scales representing another total number of linear units, each of said scales constituting a calibrated means of measurement of an entire object or parts thereof when the device is located at one or another prescribed distance from the object.

BRUCE W. DAVID.